TELEVISION PICTURE AND SOUND RECORDING SYSTEM

Filed Aug. 1, 1963

INVENTORS
PETER C. GOLDMARK &
JOHN M. HOLLYWOOD

BY Brumbaugh, Free, Graves & Donohue their ATTORNEYS

United States Patent Office 3,335,219
Patented Aug. 8, 1967

3,335,219
TELEVISION PICTURE AND SOUND RECORDING SYSTEM

Peter C. Goldmark, Stamford, and John M. Hollywood, Greenwich, Conn., assignors to Columbia Broadcasting System, Inc., New York, N.Y., a corporation of New York Filed Aug. 1, 1963, Ser. No. 299,236
13 Claims. (Cl. 178—6.7)

This invention relates to systems for recording television signals and, more particularly, to a new and improved arrangement whereby television picture and sound information may be recorded in adjacent portions of a record medium.

Heretofore, conventional motion picture techniques have required that sound track information associated with a given frame of picture information be recorded on a film strip at a location spaced by a given number of frames from the frame containing the corresponding picture information. When a film record prepared in this manner is spliced, however, the segment of film containing the picture information which has been removed also carries some sound track information relating to the picture frames whilch have not been removed and this information cannot be restored to the film in the absence of elaborate re-recording procedures. Furthermore, conventional motion picture recording systems usually require two separate recording operations, one for the picture information and the second, carefully synchronized with the first, to record the sound information.

Accordingly, it is an object of the present invention to provide a new and improved television recording system which effectively overcomes the above-mentioned disadvantages of conventional systems.

Another object of the invention is to provide a new and improved method and apparatus for recording television picture and sound information.

A further object of the invention is to provide a new and improved method and apparatus for reproducing television picture and sound information.

An additional object of the invention is to provide a new and improved television picture and sound information record.

These and other objects of the invention are attained by generating a succession of horizontal scan traces, modulating a selected portion of each horizontal scan trace with a picture information signal, modulating another selected portion of each horizontal scan trace with a corresponding sound information signal and recording the modualted horizontal scan traces successively in a transverse direction on a longitudinally moving record medium. The recording apparatus may include a line scan cathode ray tube driven by a horizontal drive oscillator at a rate higher than the maximum audio frequency to be recorded and focused on a continuously moving film, the picture information being utilized to modulate the brightness amplitude of the cathode ray spot during a first portion of each scan and the scanning spot being modulated by the sound signal during a second portion of each scan so as to form a succession of recorded pictures and a continuous adjacent sound track on the record medium. If desired, a sound track of the variable area type may be produced by driving a pulse width modulator from the audio information signal and exposing the sound track portion of the record in accordance with the width modulated pulse during each scan, the pulse preferably being centered in the sound track area.

Similarly, associated picture and sound information recorded in adjacent relation on a film record in the above manner or in any other manner may be reproduced by scanning the film record including both the picture and sound information areas with a series of successive horizontal or lateral scans by a luminous spot, the scans being spaced in the direction of elongation of the film strip, and detecting the variations in the light transmitted by the film strip and applying signals corresponding to the picture and sound information to separate outputs. In a representative reproducing apparatus, a line scan cathode ray tube driven laterally by a horizontal oscillator scans a longitudinally moving film record to illuminate a photo tube and a gating pulse derived from the horizontal drive oscillator operates a gate to select the picture and sound information signals reproduced during each scan and apply them to separate channels.

Further objects and advantages of the invention will be apparent from a reading of the following description in conjunction with the accompanying drawings, in which.

Figure 1:
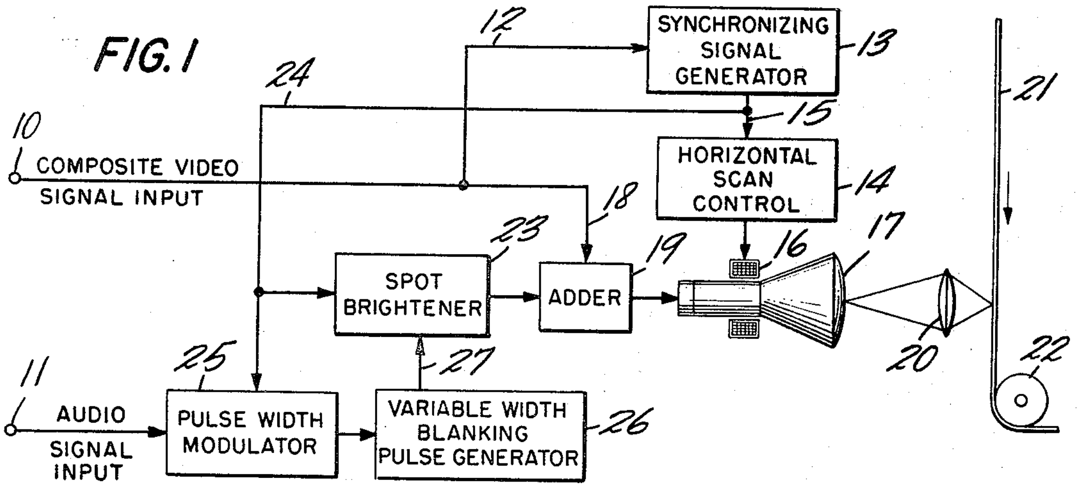
FIG. 1 is a schematic block diagram showing the arrangement of a typical recording system according to the invention.

In the typical form of recording apparatus shown in FIG. 1, a composite video signal input terminal 10 is provided to receive a television picture signal including the usual synchronizing signals and an audio input signal 11 is arranged to receive simultaneously a corresponding sound information signal. The television picture signal may, for example, be provided by a conventional television camera and associated equipment (not shown) and the corresponding audio signal may be derived, for example, from an associated microphone (not shown). If desired, of course, the video and audio signals may be taken from a complete television program signal which has been transmitted on a carrier wave and demodulated and separated into audio and video components in the usual manner.

The composite video signal from the terminal 10 is applied through a channel 12 to a synchronizing signal generator 13 so that an output signal therefrom applied to a horizontal scan control unit 14 by a cable 15 is synchronized with the horizontal synchronizing pulses in the video signal. As a result, a horizontal deflection coil 16 for a line-scan type cathode ray tube 17 causes the beam in the cathode ray tube to sweep horizontally in synchronism with the horizontal line picture information contained in the composite video signal. This information, which is applied to the tube 17 through a cable 18 and a conventional signal adder 19 is therefore reproduced on the face of the tube 17 as a series of modulated horizontal brightness lines corresponding to the individual horizontal lines of a television picture but, in this instance, the lines are reproduced in succession at a single vertical position on the tube face rather than being spread out across the face of the tube in the form of a raster.

To record this picture information in the form of a series of pictures, the face of the tube 17 is imaged by a lens 20 onto a strip of film 21 which continuously driven at constant speed in the direction of the arrow in FIG. 1 by a drive capstan 22. As a result of the recording of successive lines in longitudinally spaced relation, the film 21, when developed, presents the video information in the form of a succession of complete pictures spaced by intervals in which the vertical synchronizing signals of the composite television signal are recorded. If desired, in order to eliminate the appearance of lines in the recorded pictures, a small amplitude wobble may be imparted in the vertical direction at high frequency such as 20 megacycles to the beam in the tube 17, the amplitude being just sufficient to fill the gaps between the successive horizontal lines.

In accordance with the invention, the sound information applied to the terminal 11 is recorded in a sound track extending along the same section of the film strip 21 as the corresponding picture information by modulating the beam for a selected time interval with sound information after the termination of the picture information in each horizontal scan of the beam. In the illustrated embodiment of the invention, a sound track of the variable area type is produced by providing a spot brightener 23 which is responsive to a signal on a line 24 from the synchronizing signal generator 13 which occurs at the termination of the picture information segment of each horizontal scan to increase the brightness of the cathode ray tube spot to a maximum value and, in the absence of a blanking signal, maintain it at that brightness for a selected constant interval just prior to the occurrence of the horizontal synchronizing signal initiating return of the beam to the opposite side of the tube. At the same time, the signal on the line 24 is applied to a pulse width modulator 25 which, in response to the instantaneous level of the audio signal at the input 11, causes a blanking pulse having a duration corresponding to that amplitude to be generated by a variable width blanking pulse generator 26, this pulse being centered in time in the interval during which the spot brightener 23 is activated.

Accordingly, the blanking signal from the blanking pulse generator 26 applied to the spot brightener 23 by a line 27 reduces the spot brightness to zero or to a selected minimum value during a central interval of time which is symmetric with respect to the sound signal recording interval so as to produce in the sound track portion of the film 21, a horizontal track which when developed is light in the central portion and dark at both ends. Inasmuch as the width of the light central portion depends upon the instantaneous amplitude of the audio signal, the result of a continuous succession of such traces as the film moves longitudinally is to produce a symmetric variable area sound track. Moreover, with a horizontal scan rate of 15,750 lines per second as in conventional 525 line 30 frame per second television systems, sound frequencies up to about 7,875 cycles per second can be recorded and reproduced on the sound track. If it is desired to record higher sound frequencies, the horizontal scan rate of the system may be increased to, for example 22,000 lines per second which would permit recording of frequencies up to about 11,000 cycles.

In operation, simultaneous audio and composite video signals are applied to the terminals 10 and 11 of the apparatus shown in FIG. 1, the video signal being applied through the adder 19 to the tube 17 so as to intensity modulate the cathode ray tube beam during each sweep across the picture frame portion of the film record to produce a reconstituted picture image as the film is driven longitudinally by the capstan 22. In addition, the vertical synchronizing signals of the composite video signal are recorded on the film in the intervals between frames. After the cathode ray spot passes the end of the picture area during each sweep, the spot brightener 23 increases the brightness of the cathode ray tube spot to a maximum value and the pulse width modulator 25 converts the audio signal at the terminal 11 into a width modulated pulse signal. This signal, in turn, causes the blanking pulse generator 26 to deactivate the spot brightener 23 during the central portion of the sweep across the sound track area for a time interval dependent upon the width of the pulse from the modulator 25.

Figure 2:
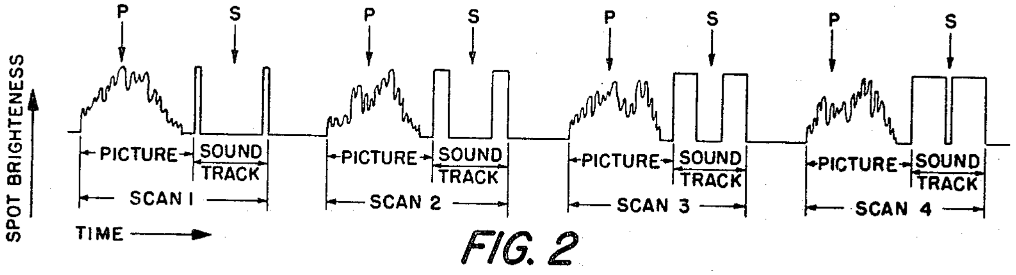
FIG. 2 is a graphical representation on an exaggerated scale representing the brightness ampiltude of a scanning spot during the recording of several successive scans.
Figure 3:
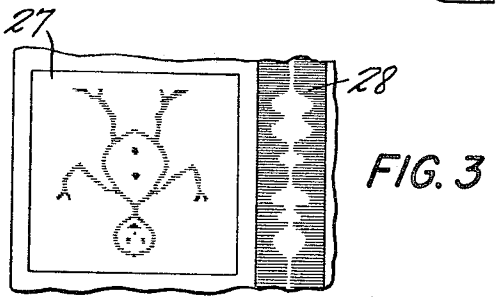
FIG. 3 is a fragmentary view of a film strip containing picture and sound information recorded in accordance with the invention.

A graphical representation of the brightness of the scanning spot against time during several successive horizontal scans is shown in FIG. 2 wherein the portions of the graph designated P represent the variations in spot brightness during recording of the picture information and the portions designated S represent the brightness variation during recording of the sound track, the time scale of the latter being exaggerated in the drawing for purposes of illustration. In the illustrated example, the amplitude of the signal at the input 11 decreased continuously during the recording interval, as indicated by the successive reduction in the duration of the zero intensity segments of the sound track portions S during the successive scans. FIG. 3 shows a developed section of film upon which a picture 28 and a variable area sound track 29 containing corresponding information have been recorded in side-by-side relation by the process described above, the width of each line not having been broadened by wobbling to fill the spaces between successive scan lines. As illustrated in FIGS. 2 and 3, the sound track is of the white or black type which is the preferred form for the final print. If the original recording is to be a negative, however, and the final print is to be positive, the polarity of the signal applied by the unit 23 to the adder 19 may be reversed.

Figure 3A:
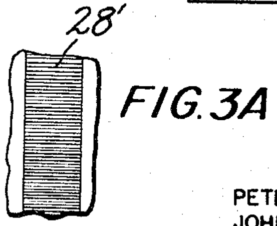
FIG. 3A is a fragmentary view of the sound information portion of a film strip, with the sound information recorded in variable density form.

Alternatively, a single sided variable area sound track may be recorded by arranging the blanking pulse generator to initiate blanking at the end of an interval corresponding to the audio signal level and maintaining the blanking to the end of the sweep across the sound track. Also, if desired, a variable density sound track may be recorded by modulating the amplitude of the scanning spot brightness with the instantaneous value of the audio signal applied to the input 11 during the sound track scanning portion. The result, of course, will be a sound track wherein each successive line has substantially the same density transversely of the sound track but successive lines are graduated in density according to the variations in audio signal amplitude, as shown in FIGURE 3A at 28'.

Preferably, the rate of motion of the film 21, which depends upon the rotational speed of the drive capstan 22, is such as to assure that each frame of picture informations applied to the input terminal 10, i.e., each of the successive interlaced 262½ line rasters according to the usual television technique, occupies the usual motion picture frame dimension in the longitudinal direction of the film so that, if desired, the picture information may be reproduced by a conventional type of projector. If desired, however, the rate of film motion may be reduced in the longitudinal film direction so as to produce a vertically compressed image on the film and, in this case, an anamorphic lens may be used if the film is to be reproduced by a conventional projector.

Figure 4:
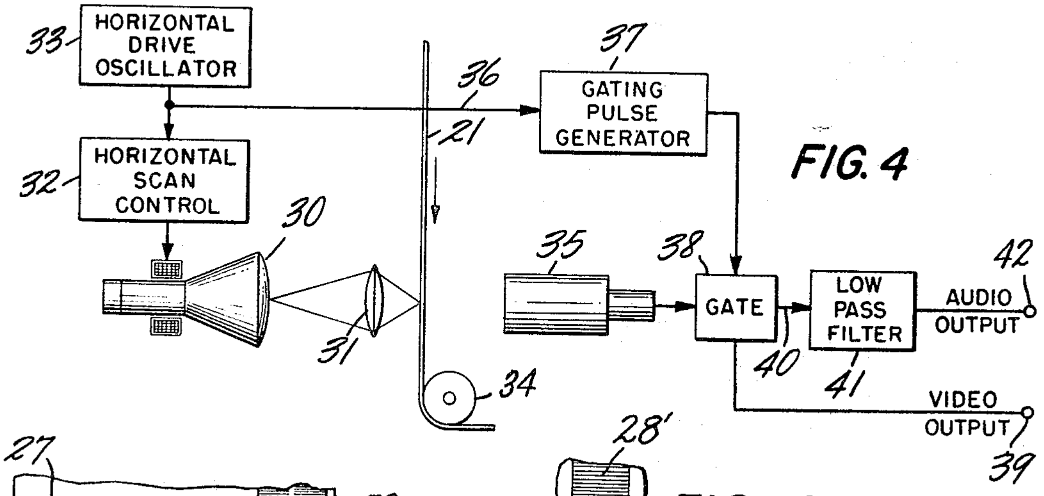
FIG. 4 is a schematic block diagram showing a representative record reproducing system according to the invention.

Although a film record prepared in the foregoing manner may be reproduced by certain types of conventional projectors wherein the film strip is driven continuously past an aperture at constant speed along with a conventional sound track detector utilizing a light source slit and photocell and disposed so as to respond to the portion of the sound track passing adjacent to the aperture, the film record may also be reproduced in a novel manner according to the invention. A typical reproducing apparatus according to the invention is shown in FIG. 4 wherein a cathode ray tube 30 having its face imaged by a lens 31 onto the strip of film 21 is driven by a horizontal scan control 32 which, in turn, is activated by a horizontal drive oscillator 33 so as to provide a single horizontal line scan of constant intensity at the usual frequency of 15,750 scan per second. If desired, of course, the horizontal scan rate may be increased to a higher value to reproduce audio frequencies higher than about 7,875 cycles per second as previously described in connection with the recording operation. Furthermore, to eliminate any moiree effects where the film record has been prepared by line scanning as described previously, a film record prepared by line scanning of the above type at a given rate may be reproduced at a different rate of line scanning and to further reduce this effect, the spot on the cathode ray tube in the reproducing system may be wobbled in the vertical direction at high frequency in the manner mentioned above.

To drive the film continuously past the image of the horizontal line produced by the cathode ray tube and thereby read out both the picture and sound information line by line, a drive capstan 34 rotates at the same speed as the capstan 22 of the recording apparatus or, if the film record has been prepared in a conventional manner, at a speed sufficient to reproduce the information in each picture frame at the usual television rate of 60 frames per second. A phototube 35 positioned on the other side of the film from the tube 30 generates a voltage signal which instantaneously represents the film density at the picture or sound track portion of the film record which is being scanned by the image of the spot on the face of the tube 30 so as to provide an output voltage signal which varies in the same manner as the light intensity signals shown in FIG. 2 but in the inverse direction.

At the same time, the horizontal drive oscillator 33 supplies synchronizing signals by a line 36 to a gating pulse generator 37 which, in turn, supplies gating pulses to a gate 38 to which the phototube signals are applied. The gating signals from the generator 37 are timed so as to cause the gate 38 to transmit the phototube output signals to a video output terminal 39 during the time when the cathode ray spot traverses the picture area of the film record 21 and to transmit the phototube output signals to a conductor 40 during the portion of each sweep when the spot scans the sound track portion of the film. In addition, the gate 38 also passes to the terminal 39 horizontal synchronizing signals from the gating pulse generator so as to provide a composite video signal at that output terminal, the vertical synchronizing signals being read out from the spaces between picture frames on the film. To eliminate the scanning frequency and its harmonics from the audio signal, a low pass filter 41 having a cut off frequency just below half the scanning rate is interposed between the conductor 40 and an audio signal output terminal 42.

In operation, as the film 21 is driven past the phototube 35, by the capstan 34, the picture and sound information are read out in succession during each scan by the horizontal line on the face of the tube 30 and the gate 38 selectively applies the corresponding phototube signals to the outputs 39 and 42, respectively. Inasmuch as all frequencies greater than the half the scanning rate have been eliminated from the audio signal by the filter 41, the audio output signal properly represents the corresponding original audio information, whether the film track has been recorded in variable area or variable density form. If desired, a film record prepared in any conventional manner but having the sound track information recorded adjacent to the corresponding picture information may also be reproduced by the type of apparatus shown in FIG. 4. In such cases, however, a vertical synchronizing signal generator arranged to produce the usual vertical synchronizing signals in response to read out of the spaces between picture frames should be included in the circuit since that information is not normally recorded by conventional techniques.

Although the invention has been described herein with reference to specific embodiments, many modifications and variations therein will readily occur to those skilled in the art. Accordingly, all such variations and modifications are included within the intended scope of the invention as defined by the following claims.

We claim:

1. Apparatus for recording picture and sound information simultaneously in adjacent relation on a record medium comprising drive means for driving a record medium continuously in one direction, recording means for scanning the moving record medium with a succession of scans directed transversely to the direction of motion, means for applying a picture information signal to the recording means during a selected portion of each scan, and means for applying a sound information signal to the recording means during another selected portion of each scan.

2. Apparatus according to claim 1 wherein the recording means comprises cathode ray tube means providing a repetitive single line horizontal scan, the means for applying a picture information signal to the recording means comprises means for modulating the cathode ray tube beam with a picture information signal during a selected portion of each scan, and the means for applying a sound information signal to the recording means comprises means for modulating the cathode ray tube beam with a sound information signal during the other selected portion of each scan.

3. Apparatus according to claim 2 wherein the means for modulating the cathode ray beam with a sound information signal includes pulse width modulator means for producing a pulse having a duration dependent upon the amplitude of the sound information signal, and means for controlling the brightness of the cathode ray tube beam in accordance with the width modulated pulses to produce a variable area-type sound record.

4. Apparatus for recording corresponding picture and sound information simultaneously in adjacent relation on a record medium comprining picture signal input means for receiving a composite video signal, sound signal input means for receiving a corresponding sound information signal, cathode ray tube means for generating a line scan trace, capstan means for driving a film strip at constant speed, lens means for focussing an image on the line scan trace on the film in a direction transverse to the direction of motion thereof so that successive line scans produce laterally extending longitudinally spaced lines on the film, horizontal scan control means for causing the cathode ray tube to produce a succession of line scan traces, synchronizing signal generator means responsive to a composite video signal applied to the picture signal input means to actuate the horizontal scan control means in synchronism therewith, and signal adder means for applying the composite video signal to the cathode ray tube during a first selected portion of each scan and applying a signal from the sound information input means to the cathode ray tube during a second selected portion of each scan.

5. Apparatus according to claim 4 wherein the sound signal input means includes pulse width modulator means for producing a pulse having a duration dependent upon the amplitude of a sound signal applied thereto, spot brightness control means for producing an extreme brightness condition of the cathode ray tube trace during the second selected portion of each scan, and control means responsive to the pulse width modulator means to cause the spot brightness control means to produce an opposite extreme brightness condition of the cathode ray tube trace for the duration of the pulse produced by the pulse width modulator means.

6. Apparatus for reproducing simultaneously picture and sound information recorded in laterally adjacent relation on a record medium comprising drive means for driving the record medium continuously in one direction, scanning detector means for scanning the record medium in successive line scans extending in a lateral direction so as to reproduce picture and sound information segments during successive portions of each scan, and signal separator means for separating the picture and sound information signals reproduced during each scan and applying them to separate output channels.

7. Apparatus for reproducing simultaneously picture and sound information recorded in laterally adjacent relation on a film strip comprising drive means for driving the film strip continuously in one direction, line scan cathode ray tube means for generating a succession of horizontal line scans, lens means for imaging the cathode ray tube trace on the film strip in a direction transverse to the direction of motion so as to illuminate picture and sound information segments of the film during successive portions of each trace, photoelectric means responsive to the light transmitted by the film strip during each trace to produce successive electrical signals representing picture and sound information segments, and gate means synchronized with the scanning rate of the cathode ray tube to separate the picture and sound information signals and apply them to separate output channels.

8. A system for reproducing recorded picture and sound information comprising, in combination:

a record medium containing corresponding picture and sound information in laterally adjacent relation comprising an elongated record member having a plurality of longitudinally spaced transversely extending record lines recorded thereon, a first portion of each line comprising a segment of picture information and a second portion of each line comprising a segment of corresponding sound information;

means for driving the record medium in the direction of elongation of the member;

scanning detector means for scanning the record medium in successive line scans extending in a lateral direction so as to reproduce the picture and sound information in the respective segments during successive portions of each scan; and signal separator means for separating the picture and sound information signals reproduced during each scan and applying them to separate output channels.

9. Apparatus according to claim 3, in which:

the pulse width modulator means is effective to locate successive duration modulated pulses in relative time symmetry in said other portions of respective scans of the cathode ray tube means.

10. Apparatus according to claim 9 in which the duration modulated pulses are centered in time in said other selected time portions.

11. Apparatus for recording picture and sound information simultaneously in adjacent relation on a record medium, comprising:

driving means for driving a record medium in one direction, recording means for scanning the moving record medium with a recording beam in a succession of scans directed transversely to the direction of motion, means for modulating the intensity of the recording beam with a picture information signal during a selected portion of each scan, and means for modulating the intensity of the recording beam with a sound information signal during another selected portion of each scan.

12. A system according to claim 8, in which:

the second portions of successive lines form a longitudinally extending sound track in which the segment of corresponding sound information in each line is disposed symmetrically therein.

13. A system as defined in claim 8, in which:

the second portions of successive lines form a longitudinally extending sound track in which the corresponding sound information in each line varies in optical density according to the intensity of the sound information.

References Cited

UNITED STATES PATENTS

| | | | |
|---|---|---|---|
| 2,916,727 | 12/1959 | Jones | 178—6 |
| 3,233,039 | 2/1966 | Mullin | 178—6.7 |

JOHN W. CALDWELL, *Acting Primary Examiner.*

H. W. BRITTON, *Assistant Examiner.*